May 5, 1936.     R. BURKE     2,039,388
RETURN BEND FITTING
Filed March 7, 1932     2 Sheets-Sheet 1
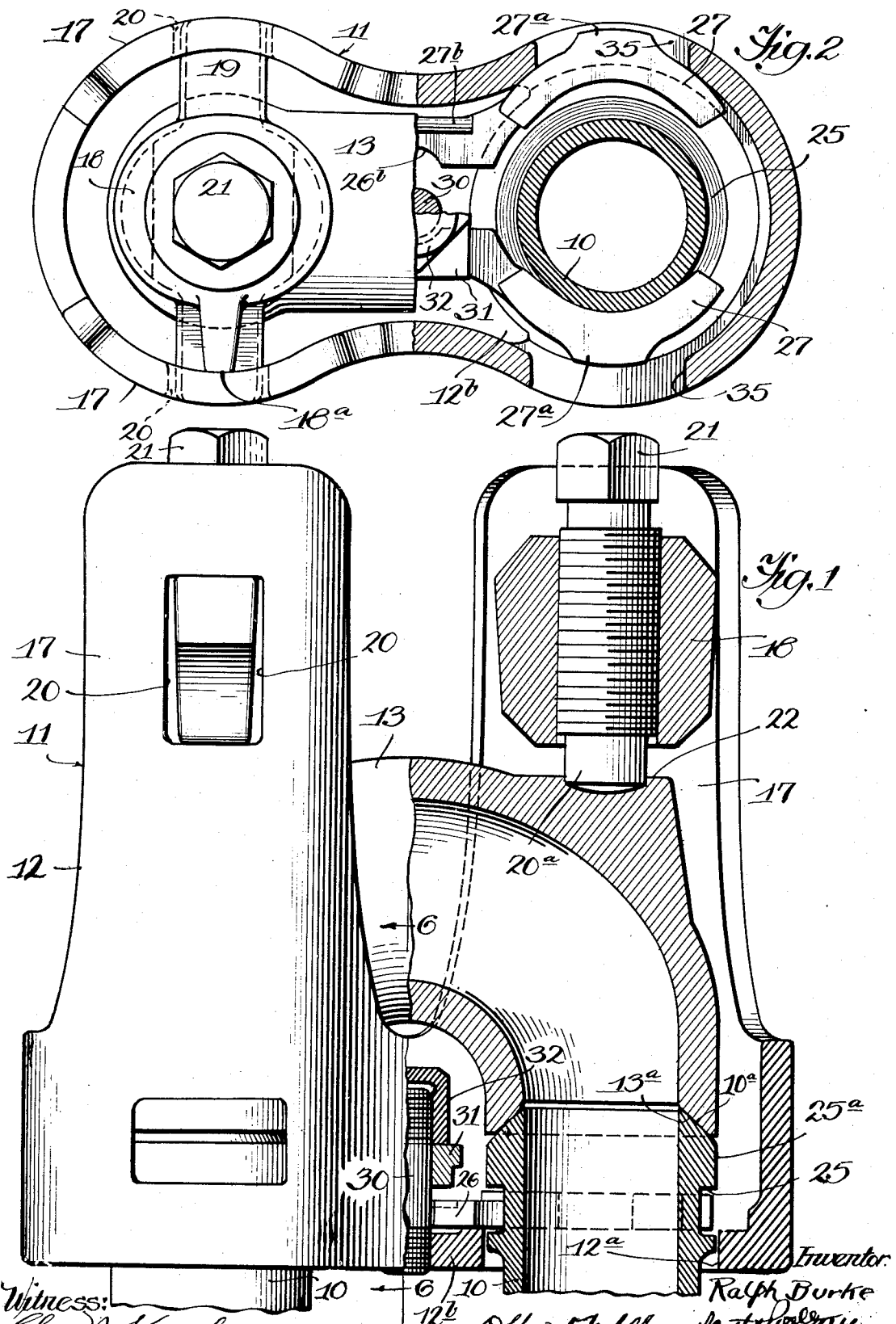

May 5, 1936.   R. BURKE   2,039,388
RETURN BEND FITTING
Filed March 7, 1932   2 Sheets-Sheet 2
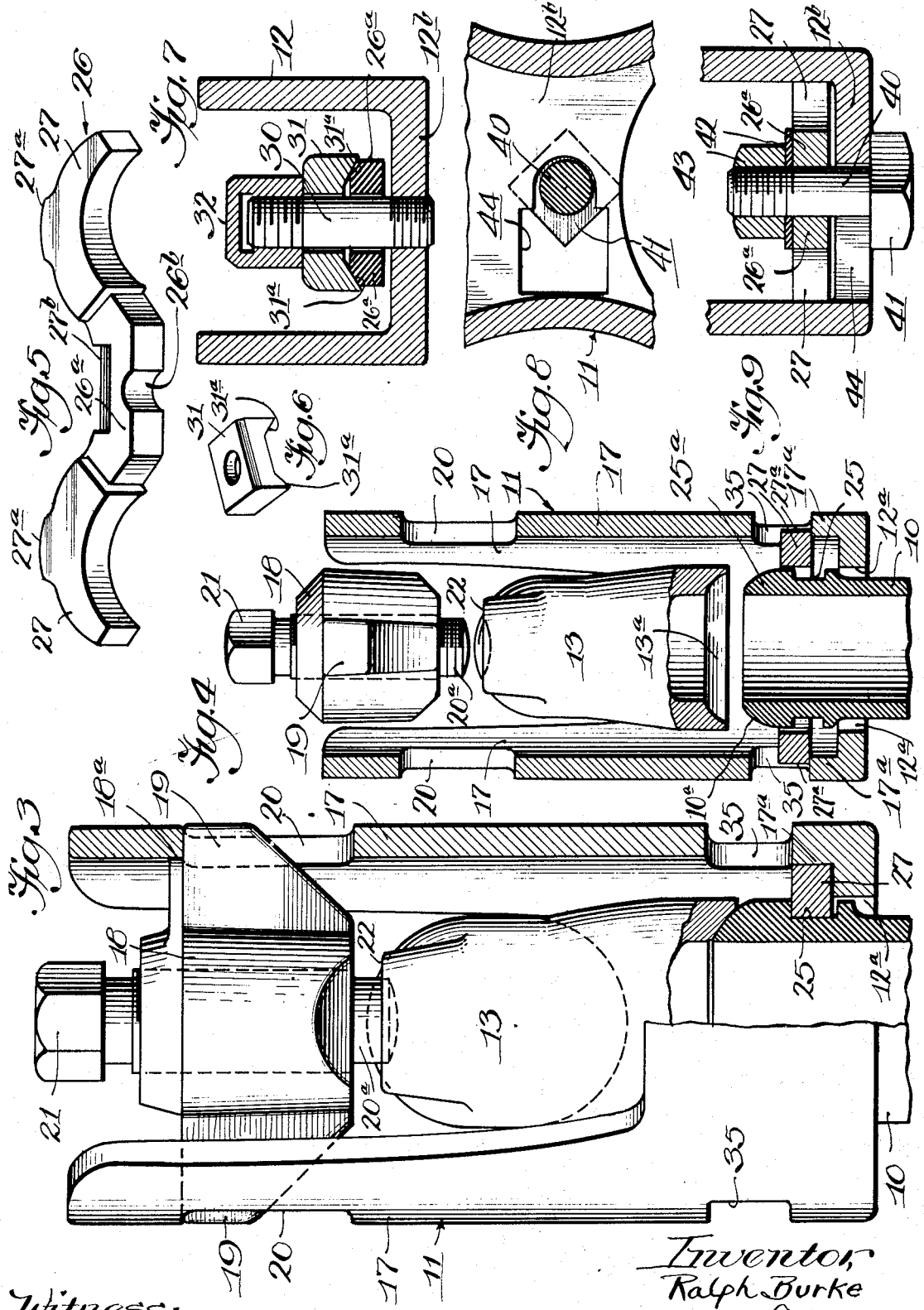

Patented May 5, 1936

2,039,388

UNITED STATES PATENT OFFICE 2,039,388

RETURN BEND FITTING

Ralph Burke, Springfield, Ohio, assignor to The Ohio Steel Foundry Company, Lima, Ohio, a corporation of Ohio Application March 7, 1932, Serial No. 597,269

9 Claims. (Cl. 285—20)

This invention relates to improvements in return bend fittings for oil refinery stills and the like, and has for its principal object to provide an improved and simplified construction for devices of the character described, and particularly with reference to the means of securing the return bend fittings on the ends of adjacent tubes so that said fittings may be readily removed and replaced from time to time as may be required for cleaning out or replacing the tubes.

The invention may best be understood by reference to the accompanying drawings, in which Figure 1 is a side view of a return bend fitting constructed in accordance with my invention, in which one-half of the fitting and associated parts are shown in vertical cross section, with the tube in locked position.

Figure 2 is a plan view of the fitting shown in Figure 1, but with one-half of the fitting broken away to show the interior construction and arrangement of the tube securing means when one of the tubes is in position to be removed or detached from the fitting.

Figure 3 is an end view of the fitting shown in Figure 1, with parts shown in transverse section.

Figure 4 is a transverse section taken in a plane substantially co-incident with the sectioned parts shown in Figure 3, but showing the securing means in unlocked position so that the U-bend and tube may be disconnected or removed from the fitting.

Figure 5 is a perspective view of one of the tube retaining pieces utilized in connection with the return bend fitting.

Figure 6 is a perspective view of one form of lock washer for holding the tube retaining pieces in locked position.

Figure 7 is an enlarged detail view taken in section on line 6—6 of Figure 1.

Figures 8 and 9 are detail views of a modified form of locking means for the tube retaining pieces which may be employed in place of the locking means illustrated in detail in Figure 7.

Referring now to details of the embodiment of my invention illustrated in the drawings, the tubes 10, 10 are herein of the type utilized in oil refinery stills or similar equipment, and are arranged as usual, in pairs. The ends of each pair of associated tubes are connected by means of the return bend fitting indicated generally at 11 and consisting of a housing or cage 12 and a U-shaped connecting piece 13 detachably secured within the cage 12 so as to form a continuous passage between adjacent ends of the tubes 10, 10. The housing 12 has a bottom wall 12$^b$ provided with apertures 12$^a$ through which the tubes project.

The joints between the tubes 10, 10 and the U-piece 13 may be of any suitable construction and arrangement, in the form shown the outer end surface 10$^a$ of the tubes 10 being chamfered and arranged to be engaged by recessed end surfaces 13$^a$ of the U-piece when the latter is forced against the end of the tubes, as clearly shown in Figure 1.

Suitable means are provided for detachably securing the U-piece in position. In the form shown the housing or cage 12 is provided with two pairs of upstanding wall portions 17, 17, one pair being at each end of the casing in vertical alignment with each tube aperture 12$^a$, and the said pairs of upstanding wall portions being spaced apart so as to permit the U-piece to be fitted therebetween. A set lock 18 is detachably mounted between each pair of upstanding walls 17, 17 adjacent their upper ends, in the form shown, said set locks having a pair of laterally extending arms 19, 19 adapted to project into apertures 20, 20 formed in the walls 17. A set screw 21 is threaded axially through each set lock 18 and arranged so that its lower end 20$^a$ engages a seat 22 formed in the upper surface of the U-piece 13 immediately above one end of the latter as clearly shown in Figure 1. Each set lock 18 is preferably provided with an upstanding shoulder 18$^a$ above one of the laterally extending arms 19, this shoulder being properly spaced so as to hold the set lock in centered position, over its respective screw seat 22 when said arms are in locking position, as shown in Figure 3.

As will appear from Figures 3 and 4, each set lock 18 may be removed by unscrewing its set screw 21 a sufficient distance to permit the set lock to be tilted axially to remove the arms 19, 19 from their corresponding apertures 20, 20. The set lock can then be rotated into position where the arms 19, 19 are parallel with the side walls 17, 17, as shown in Figure 4, in which position the set lock can be entirely removed from the housing. When both set locks 18, 18 are removed in this manner, the entire U-piece may be withdrawn upwardly and removed from the housing, as partially indicated in Figure 4.

Referring now more particularly to the means for securing the housing to the ends of the tubes 10, 10, or vice versa, it will be observed that the ends of each tube are provided with annular grooves 25, preferably formed in an enlarged head portion 25$^a$ of each tube. The tube apertures 12$^a$ formed in the lower wall of the housing 12 are, of course, large enough to accommodate the enlarged heads of their respective tubes.

A pair of tube retaining pieces 26, 26 are arranged horizontally within the bottom of the housing 12, each of said tube retaining pieces comprising a pair of oppositely extending arcuate locking portions 27, 27 adapted to fit within the annular grooves 25, 25 formed about the ends of the two tubes 10, 10 when the latter are in their locked position, as indicated in Figures 1 and 3. The arcuate locking portions 27, 27 of each retaining piece 26 are integrally connected by pieces 26ᵃ which normally extend in parallel closely adjacent relation with each other intermediate the two tubes, and are provided with mutually registering notches 26ᵇ at their centers so as to fit around a holding bolt 30, as will presently appear.

Each of the arcuate locking portions 27 of retaining members 26 are provided with projections 27ᵃ along their outer margins, which projections are normally adapted to engage or abut against the side walls 17ᵃ, 17ᵃ which are slightly widened adjacent the base of the housing. When the projections 27ᵃ are thus seated between the side walls 17ᵃ, 17ᵃ, the inner curved surfaces of their respective locking portions are held closely in locking engagement within the grooves 25, 25 of their respective tubes at opposite sides thereof, as clearly shown in Figures 1 and 3.

The two retaining members 26, 26 are locked in their tube securing position by suitable means, herein consisting of a single bolt 30 secured in upright position at the center of the bottom wall 12ᵇ of the cage between the two tube apertures 12ᵃ, and having a washer 31 thereon detachably securable thereon by means of a nut 32. The nut 32 herein shown is preferably a cap-nut to prevent rusting of the threaded parts. The washer 31 is preferably provided with a pair of outwardly and downwardly inclined bottom surfaces 31ᵃ, 31ᵃ along opposite edges thereof and arranged to engage chamfered surfaces 27ᵇ formed along the outer edges of each of the tube retaining pieces 26 opposite the center thereof, as clearly shown in Figures 5 and 6. The arrangement is such that when the washer 31 is clamped tightly over the center portions of said tube retaining pieces, said pieces are drawn together by the washer and are securely held against any lateral or axial shifting relative to the tubes. With this arrangement, the fitting and its tubes are held securely against any axial movement relative to each other.

Means are also made for permitting quick unlocking of the tube retaining pieces, this means consisting of a pair of oppositely disposed apertures 35, 35 formed in each side wall 17 of the cage opposite the upper ends of the tubes 10, 10. These apertures are disposed slightly above the widened wall portions 17ᵃ, 17ᵃ at the base of the cage, and are so arranged that when the nut 32 and washer 31 are loosened a sufficient distance in a vertical direction, the entire cage may be moved downwardly a sufficient distance to permit the side projections 27ᵃ, 27ᵃ of the tube retaining pieces to be spread laterally into the apertures, and thus permit the arcuate locking pieces 27 to be removed from the grooves 25 of said tubes. This arrangement is clearly illustrated in Figures 2 and 4; in Figure 2 the tube is shown elevated so as to permit one of the locking pieces 27 to be swung out of engagement with the adjacent groove, whereas in Figure 4 both of the locking pieces have been withdrawn from the groove and the tube is shown in a position to be freely removed from the housing.

It will be observed further that the washer 31 may also be employed to keep the retaining pieces in spread position during the removal or replacement of a tube. This is readily accomplished by partially screwing down the washer 31 when the retaining pieces are fully spread apart, with the lateral projections 27ᵃ, 27ᵃ extending into the recessed portions 35, 35. This arrangement makes it very simple to re-assemble the parts without interference from loose retaining pieces which might otherwise cause some difficulty in getting the tubes in proper re-securing position.

A modified form of securing means for the tube retaining pieces is shown in Figures 8 and 9. In this form a separate bolt 40 has its head 41 engaged with the outer or lower surface of the housing and is utilized to secure the retaining pieces 26, 26 by means of washer 42 and nut 43. In the form shown, an opening 44 is formed in the bottom wall of the housing in position to permit the bolt head 41 to be inserted or withdrawn from the upper end of the housing.

The use and operation of my improved form of return bend fitting will now be more clearly understood. It is of particular advantage as applied to oil refinery tube stills wherein it is necessary from time to time to clean out or "turbine" the tubes from either one end or the other, and it is particularly desirable to have the tubes anchored against axial movement relative to the fittings. With my improved form of end fitting, the return bend piece 13 of each fitting may be readily removed without, of course, disconnecting the fitting itself from the ends of its associated tubes. The entire fitting can also be readily removed from the tubes so as to permit replacement or repair of the latter.

The improved form of tube retaining means is particularly advantageous as it does away with the more expensive or troublesome constructions heretofore employed, in which the tube is threaded to or rolled into the return bend fittings, thus avoiding these latter types of connections which are found to be undesirable in some equipment.

As a further advantage, it will be noted that this type of fitting permits flexibility in the distance between the tubes in so far as their relation to the tube holes in the housings is concerned. In connecting the fittings to the ends of their tubes, the tubes may be passed freely through the tube holes 12ᵃ, and will thereafter be brought into proper relative position when finally locked in place by the tube retaining pieces and the U-piece 13.

Although I have illustrated and described an embodiment of my invention, it will be understood that I do not wish to be limited to the exact construction shown and described, but that various changes and modifications may be made without departing from the spirit and scope of my invention.

I claim:

1. In a return bend fitting, a housing including a bottom wall having a pair of tube apertures at opposite ends thereof, a pair of tubes having enlarged shoulders at their upper ends adapted to be inserted in said apertures, locking means for said tubes detachably connected to the bottom wall of said housing and each movable laterally toward and away from each other into and out of registering position beneath the shoulders of both of said tubes and restraining the latter from axial movement relative to said housing when in locked position, a return bend piece fitting directly on the ends of said tubes, and clamping means for said return bend piece detachably connected with said housing.

2. In a return bend fitting, a housing including a bottom wall having a pair of tube apertures at opposite ends thereof, a pair of tubes having enlarged shoulders at their upper ends adapted to be inserted in said apertures, locking means for said tubes comprising a pair of locking pieces detachably connected to the bottom wall of said housing and each having a pair of retaining portions at opposite ends movable laterally toward and away from each other into and out of registering position beneath the shoulders of both of said tubes and restraining the latter from axial movement relative to said housing when in locked position, a return bend piece fitting directly on the ends of said tubes and clamping means for said return bend piece detachably connected with said housing.

3. In a return bend fitting, a housing including a bottom wall having a pair of tube apertures at opposite ends thereof, a pair of tubes having enlarged shoulders at their upper ends adapted to be inserted in said apertures, locking means for said tubes comprising a pair of locking pieces, means for detachably connecting said locking pieces to the bottom wall of said housing between said tube apertures and each of said locking pieces having a pair of retaining portions at opposite ends movable laterally toward and away from each other into and out of registering position beneath the shoulders of both of said tubes and restraining the latter from axial movement relative to said housing when in locked position, a return bend piece fitting directly on the ends of said tubes and clamping means for said return bend piece detachably connected with said housing.

4. In a return bend fitting, a housing including a bottom wall having a pair of tube apertures at opposite ends thereof, a pair of tubes having enlarged shoulders at their upper ends adapted to be inserted in said apertures, locking means for said tubes comprising a pair of locking pieces, a single bolt for detachably connecting both of said locking pieces to the bottom wall of said housing between said tube apertures and each of said locking pieces having a pair of retaining portions at opposite ends movable laterally toward and away from each other into and out of registering position beneath the shoulders of both of said tubes and restraining the latter from axial movement relative to said housing when in locked position, a return bend piece fitting directly on the ends of said tubes and clamping means for said return bend piece detachably connected with said housing.

5. In a return bend fitting, a housing including a bottom wall having a pair of tube apertures at opposite ends thereof, a pair of tubes having enlarged shoulders at their upper ends adapted to be inserted in said apertures, locking means for said tubes comprising a pair of locking pieces detachably connected to the bottom wall of said housing and each having a pair of retaining portions at opposite ends adapted to engage beneath the shoulders of said tubes and restraining the latter from axial movement relative to said housing when in locked position, said housing also having side walls formed to hold said retaining portions against lateral movement while in locked position, but with recessed portions adapted to permit lateral unlocking movement of said retaining portions when the latter are loosened and moved bodily with said tubes axially of their respective tube apertures, a return bend piece fitting directly on the ends of said tubes and clamping means for said return bend piece detachably connected with said housing.

6. In a return bend fitting, a housing including a bottom and side walls, said bottom wall having a pair of tube apertures at opposite ends thereof, a pair of tubes having enlarged shoulders at their upper ends adapted to be inserted in said apertures, locking means for said tubes comprising two locking pieces arranged to be seated in locking position adjacent said bottom wall and with locking end portions of each of said locking pieces fitting beneath said shoulders of said tubes and closely confined between said tubes and the adjacent side wall, releasable means for securing said locking pieces in locking position as described, and said side walls having recesses spaced above said bottom wall whereby said tubes and locking pieces, when the latter are released, may be bodily moved axially to a position in which said locking end portions may be moved laterally out of fitting engagement within said tubes.

7. In a return bend fitting, a housing including a bottom and side walls, said bottom wall having a pair of tube apertures at opposite ends thereof, a pair of tubes having enlarged shoulders at their upper ends adapted to be inserted in said apertures, locking pieces each having end portions adapted to fit beneath said tube shoulders, a single clamping device between said tube apertures for detachably securing both of said locking pieces in locked position adjacent said bottom walls with their locking end portions closely confined between said tubes and the adjacent said wall, said side walls also having recessed portions permitting said tubes and locking pieces to be moved axially, when the latter are unlocked, into position in which the locking ends of said pieces may be moved laterally out of engagement with said tubes.

8. In a return bend fitting, a housing including a bottom wall having a pair of tube apertures at opposite ends thereof, a pair of tubes having enlarged shoulders at their upper ends adapted to be inserted in said apertures, locking means for said tubes comprising a pair of locking pieces, means for detachably connecting said locking pieces to the bottom wall of said housing between said tube apertures and each of said locking pieces having a pair of retaining portions at opposite ends movable laterally into and out of registering position beneath said shoulders of said tubes and restraining the latter from axial movement relative to said housing when in locked position, said detachable connecting means including a pressure member having means coacting with said locking pieces to wedge the latter inwardly toward each other when said pressure member is applied, a return bend piece fitting directly on the ends of said tubes and clamping means for said return bend piece detachably connected with said housing.

9. In a return bend fitting, a housing including a bottom and side walls, said bottom wall having a pair of tube apertures at opposite ends thereof, a pair of tubes having enlarged shoulders at their upper ends adapted to be inserted in said apertures, locking pieces each having end portions adapted to fit beneath said tube shoulders, a single clamping device between said tube apertures for detachably securing both of said locking pieces in locked position adjacent said bottom walls with their locking end portions closely confined between said tubes and the adjacent side wall, said clamping device including a pressure member having means coacting with said locking pieces to wedge the latter inwardly toward each other when said pressure member is applied, said side walls also having recessed portions permitting said tubes and locking pieces to be moved axially, when the latter are unlocked, into position in which the locking ends of said pieces may be moved laterally out of engagement with said tubes.

RALPH BURKE.